Figure 1:
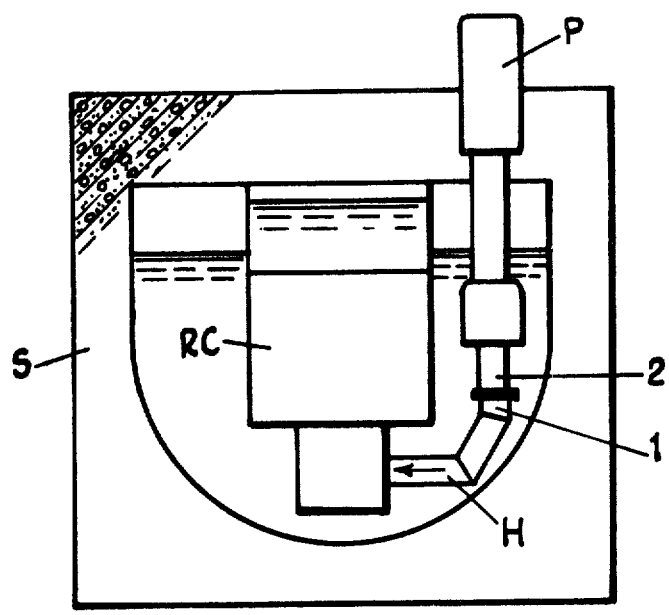

United States Patent [19]

Lee

[11] 4,101,148
[45] Jul. 18, 1978

[54] PIPE JOINTS

[75] Inventor: Alan Stuart Lee, Leicester, England

[73] Assignee: The English Electric Company Limited, London, England

[21] Appl. No.: 736,819

[22] Filed: Oct. 29, 1976

[30] Foreign Application Priority Data

Dec. 2, 1975 [GB] United Kingdom ............. 49486/75

[51] Int. Cl.² ............................................ F16L 55/00
[52] U.S. Cl. ..................................... 285/13; 176/87; 277/3; 285/24; 285/95; 285/302
[58] Field of Search ................ 285/9, 95, 13, 14, 24, 285/27, 224, 302, 331, 332, DIG. 1, 165; 176/87, 38; 277/3, 27, 29, 53, 54

[56] References Cited

U.S. PATENT DOCUMENTS

| 505,550 | 9/1893 | Iles | 285/332 X |
|---|---|---|---|
| 1,780,693 | 11/1930 | Yazel | 285/9 R |
| 2,536,793 | 1/1951 | Andersson et al. | 285/13 |
| 3,173,710 | 3/1965 | Kinnison | 285/9 R |
| 3,233,549 | 2/1966 | Howe | 285/9 R X |
| 3,601,410 | 8/1971 | Guinard | 285/9 R X |

Primary Examiner—Werner H. Schroeder
Assistant Examiner—Moshe I. Cohen
Attorney, Agent, or Firm—Kirschstein, Kirschstein, Ottinger & Cobrin

[57] ABSTRACT

A joint between adjacent ends of two pipes arranged to convey liquid under pressure, and which permits relative movement of the pipes, has a first sealing surface of annular form associated with one of the pipe ends and a sealing member supported by the other pipe and movable axially relatively thereto, and having a second sealing surface of annular form which co-operates with the first sealing surface, the sealing member being urgeable away from the first sealing surface by the pressure of liquid within the pipes against a restraining force to provide a clearance between the sealing surfaces which is adequate to permit relative transverse movement of the sealing surfaces to take place without sliding contact, but at the same time provides a high resistance to the flow of fluid between them.

12 Claims, 4 Drawing Figures

PIPE JOINTS

This invention relates to pipe joints, more especially though not exclusively for use in nuclear reactors.

The containment vessel of a nuclear reactor, especially that of a liquid metal cooled fast breeder reactor, usually consists of an internally insulated, metal lined, reinforced concrete structure which is itself cooled by means of circulating inert gases, thus maintaining the concrete at a relatively low temperature. The liquid metal inside the vessel, on the other hand, is necessarily at a much higher temperature so that any internal structures immersed in the liquid will also be at the higher temperature. Consequently, due to the differential thermal expansion of the concrete and internal structures, components which may be at a particular distance from the reactor centre line during initial construction of the reactor will be at different distances when the temperature is raised after completion. In a large reactor these differences may be in excess of 100 mm for components near the periphery of the vessel. Changes in relative positions also occur during operation as the liquid metal temperature is varied. Some small vertical differential expansions must also be accommodated simultaneously.

These differential movements are the reason for particular difficulties with removable components such as coolant circulating pumps and heat exchangers which are supported by the cooled concrete roof structure of the reactor vessel while having to engage with pipes fixed to internal structures. Thus in the case of centrifugal coolant circulating pumps the outlet pipe must connect with an internal pipe of the system in such a way that a sealing joint is made automatically as the pump is lowered into the reactor. This seal must not only limit the leakage, in operation, from the inside of the pipe to the surroundings but must be of such a design that negligible strain is imposed on the pump structure due to the differential expansions, otherwise undesirable effects occur in the parts of the pump which must have small running clearances.

Solutions to this problem already exist, a common one being the use of a bellows pipe on the pump outlet pipe but this has the disadvantage that the bellows pipe must be of inconvenient length if it is to be effective in imposing only small loads on the pump, in particular it reduces the submergence available for the pump impeller. Also, features such as bellows in the pump outlet duct are undesirable as the probability of a pipe failure arising from the pulsating flow in the pump outlet pipe is thereby increased.

An object of the invention is to provide an alternative form of joint capable of accommodating movement resulting from differential expansions.

According to the invention a joint between adjacent ends of two pipes arranged to convey liquid under pressure comprises a first sealing surface of annular form associated with one of the pipe ends, a sealing member supported by the other pipe end and movably axially relative thereto, and having a second sealing surface of annular form which co-operates with the first sealing surface, the sealing surfaces being so constructed that, in use, the pressure of the liquid within the pipes causes the sealing member to be urged away from the first sealing surface against a restraining force to provide a clearance between the sealing surfaces which is sufficiently small to provide a high resistance to the flow of liquid between them, but which permits relative transverse movement of the sealing surfaces to take place without sliding contact.

The restraining force which acts to urge the member towards the first sealing surface may be provided at least partly by the weight of the member, where this is located above the first sealing surface; in addition the restraining force may be provided partly by liquid pressure acting on surfaces of the member opposed to the second sealing surface.

The second sealing surface preferably has a planar outer portion and a recessed inner portion, which may also be generally planar, the surfaces being interconnected by a shallow step.

It has been found that, for any given pressure within the pipes, the clearance between the planar outer portion of the second sealing surface and the first sealing surface, and consequently the leakage flow, is a function of the step height, so that a required clearance may be obtained by choosing this accordingly.

It has also been found that leakage can be further reduced by shaping the recessed part of the second sealing surface to produce a turbulent flow of liquid between the two sealing surfaces, for example by roughening or grooving.

The first sealing surface may be provided on a separate member in sealing contact with the associated pipe end, and may incorporate a conical skirt the inner surface of which is arranged to be held against a co-operating surface at the end of the associated pipe, by liquid pressure acting on the first sealing surface. Where the pipe associated with the member having the second sealing surface is required to be readily removable from that associated with the member having the first sealing surface in such an arrangement the two members may be carried by removable pipe, the conical skirt facilitating the assembly of the joint on reconnection.

The member having the first sealing surface may, for example, be formed with an outwardly extending flange which, prior to assembly, rests on a support, such as an apertured plate, carried by said other pipe, and from which it is lifted on connection of the joint, the member being free to move transversely relative to said support.

The member having the second sealing surface is conveniently telescopically slidable relative to a tubular guide fixed to the associated pipe to permit relative axial movement of the member towards the first sealing surface. Ring seals are conveniently provided between the co-operating surfaces of the tubular guide and the telescopically slidable member.

Figure 3:
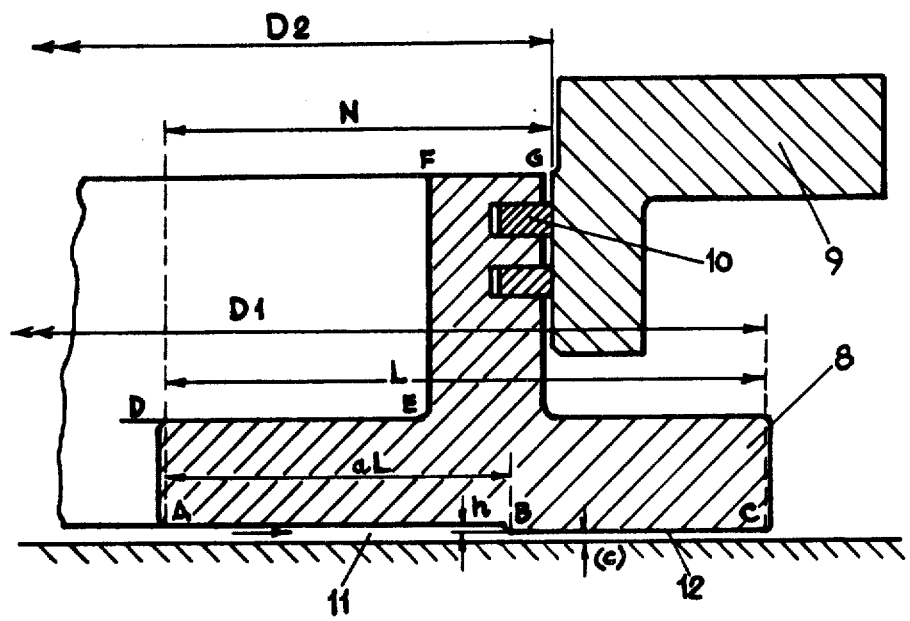
Figure 4:
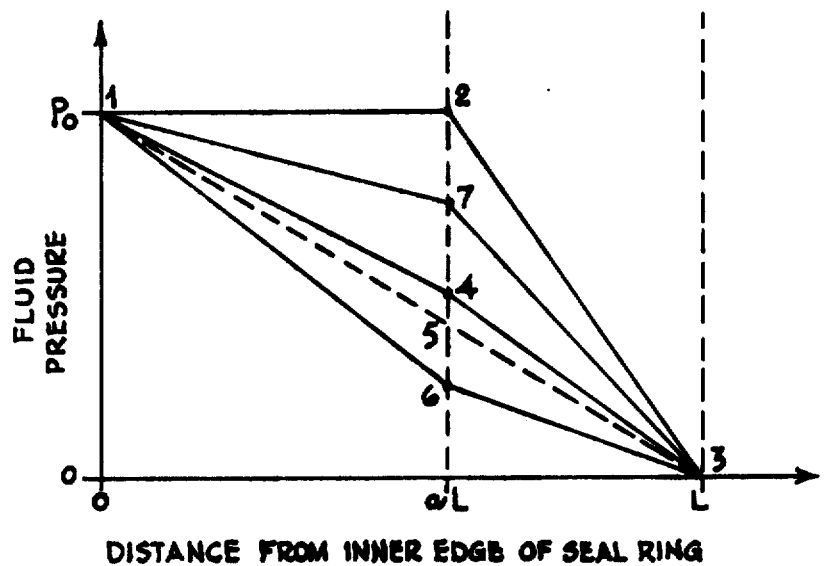
Figure 2:
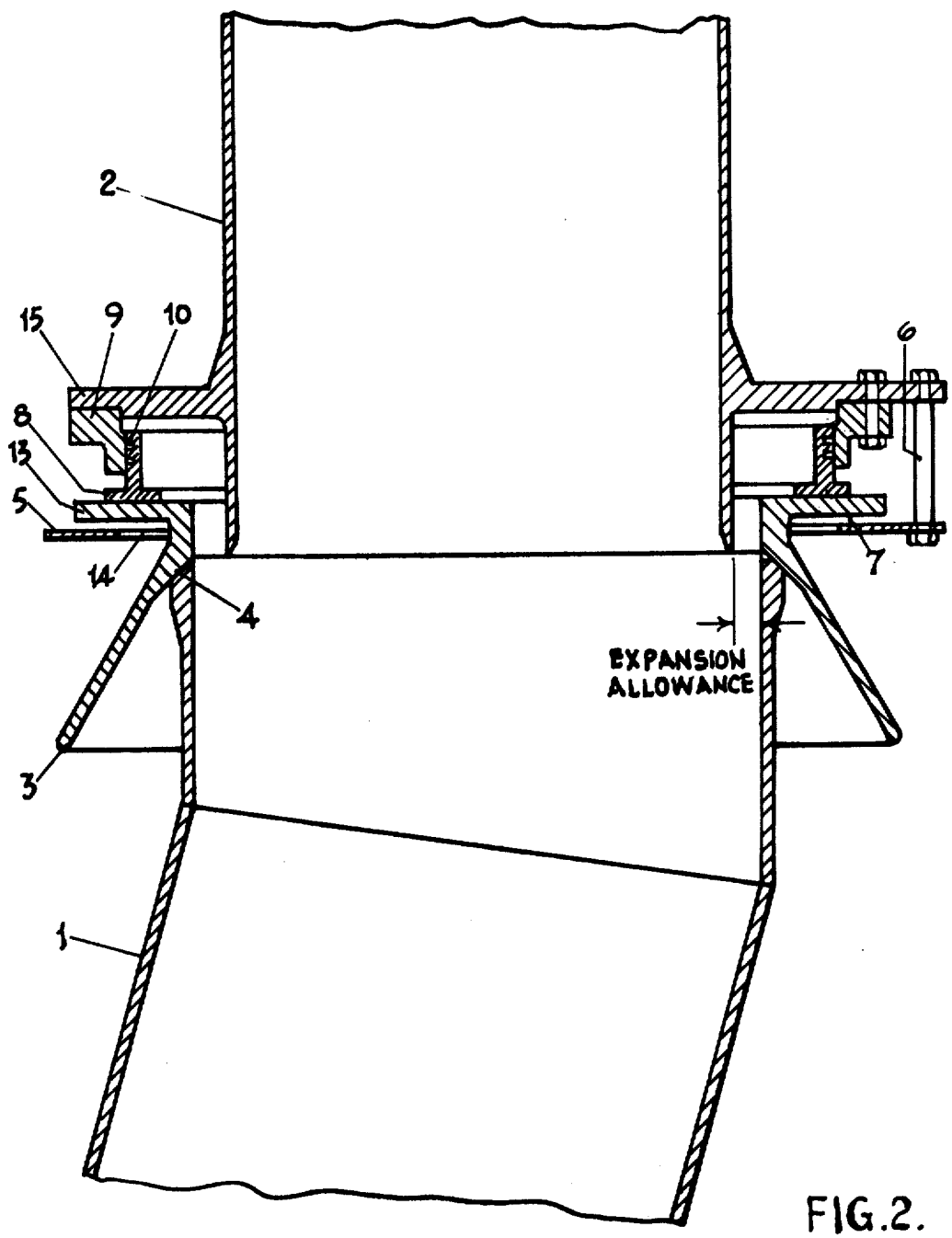

The invention will now be described by way of example with reference to FIGS. 1 to 4 of the accompanying schematic drawing, in which:

FIG. 1 represents in diagrammatic form a liquid-metal-cooled fast breeder reactor, FIG. 2 represents a cross-section of a joint in accordance with the invention utilised in the reactor, FIG. 3 illustrates an enlarged view of part of the joint, and FIG. 4 is a graph illustrating pressure variations between two relatively moving surfaces of the joint.

FIG. 1 shows a section through the reactor comprising a reactor core RC accommodated within an insulated metal-lined reinforced concrete shell S. The reactor core is cooled by the liquid sodium circulated by a pump P supported by the roof of the outer shell S, high temperature pipes H connecting the pump to the core. The concrete shell is itself cooled by the circulation of inert gases, but this is not part of the invention and the means of achieving it have not been illustrated.

Since the pump P is carried by the roof of the concrete shell S a degree of movement tends to take place between the pump outlet 2 and the internal pipe system in use of the reactor owing to differential expansions, and this needs to be accommodated in the joint.

FIG. 2 shows the general arrangement of the pipe joint where 1 represents a fixed high temperature pipe in the reactor and 2 the pump outlet pipe for which the thermal movements are similar to those of the cooled roof. The pipe 2 carries a seating member 3 in the form of a conical skirt having an accurately machined joint face on its inner surface which mates with a similar face at the end of the pipe 1 to form a seal at 4. The upper end of the seating member 3 is formed with an outwardly extending flange 13. During insertion and withdrawal of the pump the flange 13 of the member 3 rests on the upper surface of a plate 5 having an opening 14 through which the member extends, the plate being suspended from the further flange 15 on the exterior of the pipe 2 by means of tie rod bolts 6. The opening 14 is of greater diameter than the part of the member 3 which it surrounds such that, when the pump is lowered into position, the member 3, by virtue of its conical shape, is guided on to the seat 4 whatever the position of the pipe 1, the member 3 sliding laterally on the plate 5 if necessary. After making contact with the seat 4 a further lowering of the pump on to the roof foundation creates a small gap 7 between the member 3 and the plate 5. Thus, the member 3 is now free to move with the pipe 1 relative to the pipe 2. The upper surface of the member 3 is a level smooth flat surface on which rests a seal ring 8, located freely in the bore of a cylindrical holding ring 9 which is bolted to the pipe 2. The seal ring 8 also carries piston rings 10 which restrict the fluid leakage between the seal ring 8 and the holding ring 9.

The under side of the seal ring 8 is shaped as illustrated in FIG. 3, the part AB being a level flat surface which is displaced by a small amount $h$ relative to the smooth flat level surface BC. The outside diameter ($D_1$) of the surface ABC is greater than the diameter ($D_2$) of the bore of the holding ring 9 while the width ($aL$) of the surface AB is less than the radial distance N between the inner diameter of the seal ring 8 and the bore of the holding ring 9.

On initial assembly, before starting the pump, the weight of the seal ring 8 causes it to rest on the upper surface of the member 3, making contact on the surface BC. On starting the pump, the fluid pressure increases in the pipe 2 and reaches the clearance 11 between the seal ring 8 and the member 3 thus exerting a force upwards on the seal ring 8. The fluid pressure is also transmitted into the clearance 12 owing to the necessarily imperfect contact between the surface BC of the seal ring and the adjacent surface. An additional upward force is therefore exerted on the surface BC. These forces are opposed by a downward force which results from the pipe pressure acting also on the surfaces DE and FG together with the weight of the seal ring 8. However, the ratio ($aL$) of the width of the surface AB to the overall width (L) of the seal ring is so chosen that the upward force exceeds the downward force and the seal ring lifts. On lifting, leakage of the fluid commences along the clearances 11 and 12, causing a pressure gradient in the clearance 11 due to the frictional pressure losses occurring with the flow. These frictional losses reduce the average pressure in the clearances 11 and 12 thus reducing the upthrust. As the clearances increase the pressure in them decreases until the upward force exerted on the seal ring 8 equals the downward force so that the ring stabilises at a determinate value of the clearance 12.

The working of the seal can be more clearly understood by examining the graph FIG. 4 which shows how the pressure varies across the underside of the seal ring under various conditions. With the surface BC in contact the leakage flow is negligible and the pressure in the clearance 11 is constant, as shown by the line 1–2, at the value of the pipe pressure Po measured above the outside pressure. The outside pressure is therefore zero and the pressure gradient over the land BC is as shown by the line 2–3. Under these conditions the upward force on the seal ring is proportional to the area of the graph 0–1–2–3. If the value ($c$) of the gap in the clearance 12 were to become very large compared with the height of the step ($h$), so that the effect of the latter on the velocity of flow was negligible, the pressure gradient along the whole space would tend to a uniform value, as shown by the dotted line 1–5–3 of FIG. 4. In practice the gradient will be approximately uniform as indicated by the line 1–4–3. The upward force in this case is proportional to the area 0–1–4–3. Thus the variation in force which may be exerted by the seal, while floating with a finite value of the clearance ($c$), is proportional to the area 1–2–3–4–1. In practice the ratio ($a$) is so chosen that the seal stabilises with some intermediate pressure distribution such as that represented by the line 1–7–3, when the seal may resist additional forces acting in either direction without making contact on the land BC. These additional forces may result from friction in the bore of the holder ring 9 due to the piston rings 10 or as a result of pressure pulsations in the pipe 2. This margin on the force which the seal face may exert is also necessary for the accommodation of imperfections in the components arising during manufacture or as a result of strains or thermal distortions in service.

Thus, the seal ring 8 may be made to float, without making sliding contact with the member 3, as long as the pump is producing a suitable pressure.

This absence of sliding contact is an advantage, particularly in cases where the fluid being sealed is not suitable for the boundary lubrication of sliding surfaces and where fretting damage may occur, if surfaces were allowed to slide, due to the vibrational movements of the pipe 2.

It can be shown that the gap distance ($c$) of the clearance 12 is a function of the step height ($h$) so that the gap ($c$) may be set to any desirable amount by adjustment of the height ($h$). Consequently the leakage flow is also a function of ($h$). It is however, desirable to minimise the leakage flow for a particular value of the gap ($c$) and therefore, in cases where the viscosity of the fluid is such that turbulent flow exists in the clearances 11 and 12, an improvement may be made by roughening the surface AB such that a greater resistance to the leakage flow is obtained. It is not desirable to roughen the surface BC as this must be maintained in a smooth condition to allow occasional contact and sliding when the pump is not producing a pressure in the pipe 2. The effect of roughening the surface AB is illustrated in FIG. 4 by the line 1–6–3, for a large value of the gap ($c$), showing that the pressure gradient and therefore, the leakage in the clearance BC has been reduced. Also, the vertical load carrying capacity of the seal is now greater than with a smooth surface AB as the load change is now proportional to the area 1-2-3-6-1 instead of the area 1-2-3-4-1.

The pressures acting on the underside of the seal ring 8 also exerts a downward force on the member 3 which produces a further reaction at the seat 4 thus contributing to the satisfactory sealing at the seat 4.

Although the joint described is used to connect a pump to internal pipework of a nuclear reactor it will be appreciated that a joint in accordance with the invention is also applicable to other pipe systems in which movement of various parts of the system due to differential expansions and other causes has to be accommodated. Moreover the invention may also be applied, in some cases, to pipe systems designed to convey gaseous fluids, as well as liquid conveying systems.

I claim:

1. A joint between adjacent ends of a first and a second pipe for conveying liquid under pressure, comprising means to prevent separation of said adjacent ends of said first and second pipes, a first sealing member of annular form in sealing contact with the said end of the first pipe and having a radially extending first sealing surface facing a sealing assembly which incorporates a tubular support section secured to the second pipe at or near its said end, and a second sealing member having a substantially cylindrical surface in sliding and sealing abutment with a co-operating, substantially cylindrical surface of the tubular support section, thereby to permit axial movement of the second sealing member relative to the support section, said second sealing member having an annular, radially extending, second sealing surface facing said first sealing surface and being urgeable away therefrom by the pressure of the liquid within the pipes against a restraining force, provided at least partly by the pressure of the liquid acting upon at least one further surface of said second sealing member, to provide a clearance between said sealing surfaces which is adequate to permit relative transverse movement of the sealing surfaces to take place without sliding contact but at the same time provides high resistance to the radial flow of liquid between them, thus forming a substantially sealing joint between said adjacent pipe ends.

2. A joint according to claim 1 in which the axes of the pipes in the region of the joint are substantially vertical, with the first pipe lowermost, such that at least a further part of the restraining force which acts to urge the second sealing member towards it is provided by the weight of the second sealing member.

3. A joint according to claim 1 wherein the second sealing member has at least one said further surface which is opposed to the second sealing surface and on which the liquid pressure acts to provide part of the restraining force.

4. A joint according to claim 1 wherein the first sealing surface is of planar form and the second sealing surface has a planar outer portion and a recessed inner portion, which portions are interconnected by a shallow step.

5. A joint according to claim 4 wherein the recessed portion of the sealing surface is shaped to produce a turbulent flow of liquid between the two sealing surfaces.

6. A joint according to claim 1 wherein the first sealing member is separatable from said end of the first pipe.

7. A joint according to claim 6 wherein the first sealing member incorporates a conical skirt the inner surface of which is held against a cooperating surface at the end of the first pipe by liquid pressure acting on said first sealing surface.

8. A joint according to claim 7 in which the axes of the pipes in the region of the joint are substantially vertical with the first pipe lowermost, and said first sealing member is formed with a radially outwardly extending flange which, prior to assembly, rests on a support carried by said sealing assembly, and from which it is lifted on connection of the joint, the first sealing member being free to move transversely relative to said support.

9. A joint according to claim 8 wherein the support comprises a plate provided with an opening through which the first sealing member extends, the diameter of the opening being greater than the external diameter of the part of the first sealing member which it surrounds.

10. A joint according to claim 9 wherein said second pipe has an outwardly projecting flange, to which are attached support means connecting said plate to the flange.

11. A joint according to claim 1 wherein a cylindrical outer surface of the second sealing member is in sliding and sealing abutment with the cylindrical surface of the bore of the tubular support section so as to be slidable relative thereto.

12. A joint according to claim 11, in which the second sealing surface has a planar outer portion and a recessed inner portion connected to the outer portion by a shallow step, wherein the outer diameter of the second sealing surface is greater than the diameter of the bore of the tubular support section with which the outer surface of a tubular part of the second sealing member is in sliding and sealing abutment, and the radial width of the recessed inner portion of the sealing surface is less than the radial distance between the inner edge of the sealing surface and the bore of the tubular support section.

* * * * *